(12) United States Patent
Caldwell

(10) Patent No.: US 11,472,964 B2
(45) Date of Patent: Oct. 18, 2022

(54) COATING COMPOSITIONS FOR GLASS SUBSTRATES

(71) Applicant: GEMTRON CORPORATION, Sweetwater, TN (US)

(72) Inventor: Daniel Caldwell, Chattanooga, TN (US)

(73) Assignee: GEMTRON CORPORATION, Sweetwater, TN (US)

( * ) Notice: Subject to any disclaimer, the term of this patent is extended or adjusted under 35 U.S.C. 154(b) by 279 days.

(21) Appl. No.: 16/587,135

(22) Filed: Sep. 30, 2019

(65) Prior Publication Data

US 2020/0024457 A1    Jan. 23, 2020

Related U.S. Application Data

(63) Continuation of application No. 15/335,551, filed on Oct. 27, 2016, now abandoned.

(60) Provisional application No. 62/247,004, filed on Oct. 27, 2015.

(51) Int. Cl.
| | |
|---|---|
| C09D 1/00 | (2006.01) |
| C03C 17/34 | (2006.01) |
| C09D 5/33 | (2006.01) |
| C09D 7/63 | (2018.01) |
| C08K 5/095 | (2006.01) |

(52) U.S. Cl.
CPC ............ *C09D 1/00* (2013.01); *C03C 17/3452* (2013.01); *C09D 5/004* (2013.01); *C09D 7/63* (2018.01); *C08K 5/095* (2013.01)

(58) Field of Classification Search
None
See application file for complete search history.

(56) References Cited

U.S. PATENT DOCUMENTS

| | | | |
|---|---|---|---|
| 3,701,872 | A | 10/1972 | Levinson |
| 3,853,612 | A | 12/1974 | Spanoudis |
| 4,398,077 | A | 8/1983 | Freedman |
| 5,350,927 | A | 9/1994 | Rakhimov |
| 6,024,084 | A | 2/2000 | Gerhardinger |
| 6,436,541 | B1 | 8/2002 | Sopko |

(Continued)

FOREIGN PATENT DOCUMENTS

| | | |
|---|---|---|
| CN | 101568206 | 10/2009 |
| CN | 201668310 | 12/2010 |

(Continued)

OTHER PUBLICATIONS

International Preliminary Report on Patentability for corresponding PCT/US17/45302 dated Aug. 28, 2018, 10 pages.

(Continued)

*Primary Examiner* — Colin W. Slifka
(74) *Attorney, Agent, or Firm* — Marshall, Gerstein & Borun LLP

(57) ABSTRACT

The present disclosure provides a coated glass substrate, first and second coating compositions, and a process for coating the substrate. The first composition includes a source of tin, a source of fluorine, a source of titanium, and a solvent. The second composition includes a source of tin, a source of fluorine, and a solvent, and can be free of titanium. The first composition is applied to the substrate under elevated temperatures, and a first or sub layer is formed on the substrate via pyrolysis. The second composition is then applied, to form a second or top layer over the sub layer.

13 Claims, 1 Drawing Sheet

(56) References Cited

U.S. PATENT DOCUMENTS

| | | | |
|---|---|---|---|
| 6,596,398 | B1 | 7/2003 | Russo |
| 6,797,388 | B1 | 9/2004 | Szanyi |
| 6,822,208 | B2 | 11/2004 | Henze |
| 7,556,868 | B2 | 7/2009 | Thiel |
| 8,573,194 | B2 | 11/2013 | Henn |
| 8,772,687 | B2 | 7/2014 | Boxman |
| 2006/0188730 | A1 | 8/2006 | Varanasi |
| 2007/0077411 | A1 | 4/2007 | Hatta |
| 2009/0197097 | A1 | 8/2009 | Medwick |
| 2010/0155043 | A1 | 6/2010 | Smith |
| 2014/0004323 | A1 | 1/2014 | Bockmeyer |
| 2014/0220272 | A1 | 8/2014 | Lee |
| 2015/0168618 | A1 | 6/2015 | Nakajima |
| 2016/0195651 | A1 | 7/2016 | Yoshioka |

FOREIGN PATENT DOCUMENTS

| | | |
|---|---|---|
| CN | 102153959 | 8/2011 |
| CN | 203861052 | 10/2014 |
| CN | 204141996 | 2/2015 |
| CN | 104812115 | 7/2015 |
| DE | 4422439 | 1/1996 |
| JP | H0668975 | 3/1994 |
| JP | H0948640 | 2/1997 |
| WO | 2007046085 | 4/2007 |
| WO | 2015185214 | 12/2015 |
| WO | 2016144312 | 9/2016 |
| WO | 2018027034 | 2/2018 |
| WO | 2018031019 | 2/2018 |

OTHER PUBLICATIONS

Yang, "Silicon carbide powders: Temperature-dependent dielectric properties and enhanced microwave absorption at gigahertz range", ELSEVIER, Solid State Communications, vol. 163, pp. 1-6.

International Search Report and Written Opinion for corresponding PCT/US17/45302 dated Oct. 20, 2017, 10 pages.

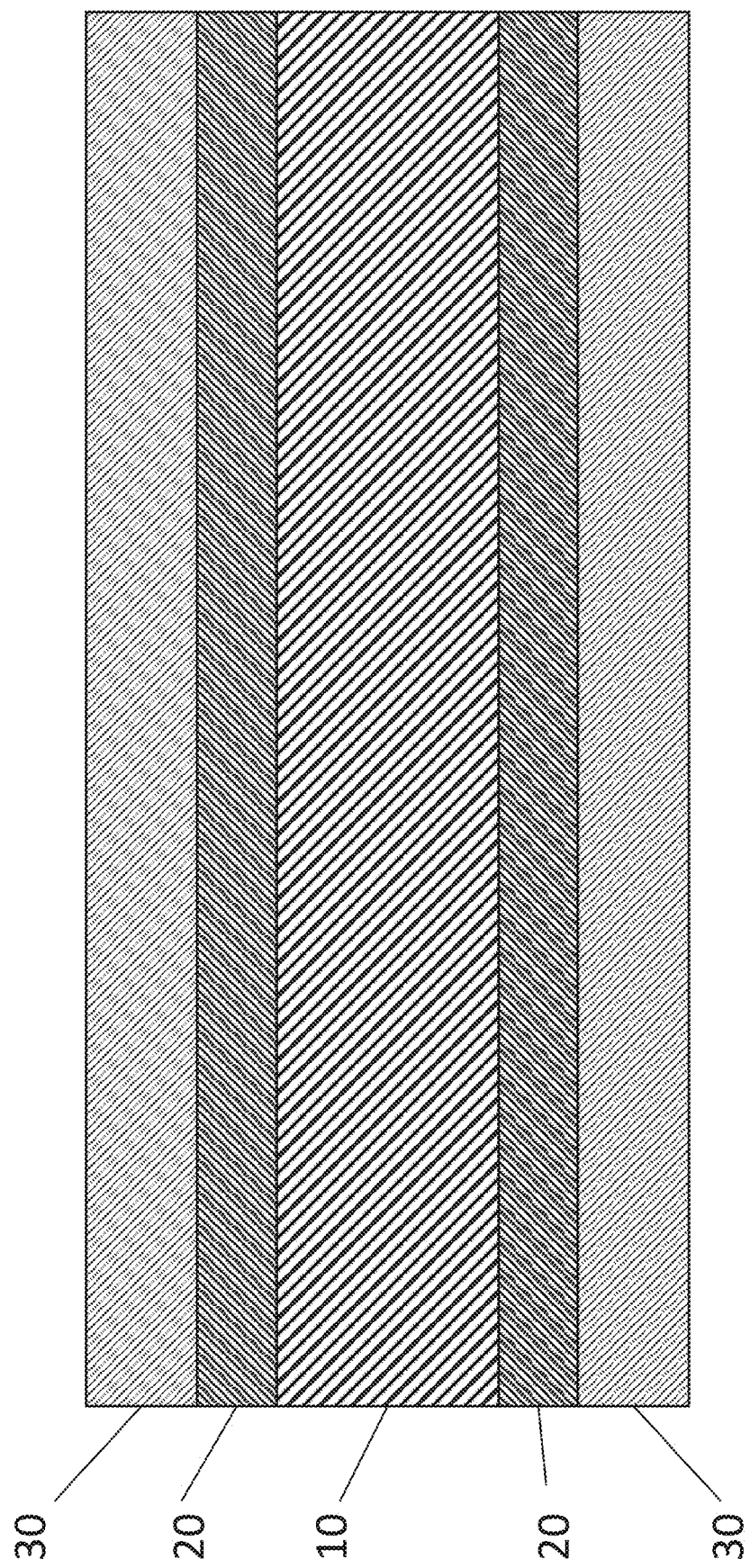

COATING COMPOSITIONS FOR GLASS SUBSTRATES

CROSS-REFERENCE TO RELATED APPLICATIONS

The present application is a continuation of U.S. Ser. No. 15/335,551, filed on Oct. 27, 2016, which in turn claims the benefit of U.S. Provisional Patent Application Ser. No. 62/247,004, filed on Oct. 27, 2015, each of which is herein incorporated by reference.

BACKGROUND OF THE DISCLOSURE

1. Field of the Disclosure

The present disclosure relates to coatings for glass substrates that are doped or reacted with materials that provide improved heat reflection characteristics for the substrate. More particularly, the present disclosure provides a first coating composition that includes a source of tin, a source of fluorine, a source of titanium, and a solvent. A second coating composition includes a source of tin, a source of fluorine, and a solvent. The present disclosure also provides a coated substrate and a process for making the same.

2. Description of the Related Art

Glass substrates are used as oven doors, so that a user can see inside the oven. However, many substrates, with or without currently available coatings, do not reflect heat well. Thus, heat from inside the oven passes through the glass oven door, which reduces oven efficiency and heats the environment in the area of the oven. There is a need to improve upon these disadvantages.

SUMMARY OF THE DISCLOSURE

The present disclosure provides a first coating composition that comprises a source of tin, a source of fluorine, a source of titanium, and a solvent. This first coating composition is applied to a glass substrate to form a first or sub layer on the substrate. A second coating composition can include a source of tin, a source of fluorine, and water, without (i.e., is free of) the titanium. This second composition is applied over the first or sub layer, to form a second or top layer. The resulting dual-layer structure on the substrate provides excellent resistance to and reflection of the heat inside the oven.

Thus, in one embodiment, the present disclosure provides a first coating composition, comprising: a source of tin, present in an amount of 15 wt % to 50 wt %, based on the weight of the composition; a source of fluorine, present in an amount of 5 wt % to 30 wt %, based on the weight of the composition; a source of titanium, present in an amount of 2 wt % to 15 wt %, based on the weight of the composition; and a solvent.

The present disclosure also provides a second coating composition, comprising: a source of tin, present in an amount of 15 wt % to 50 wt %, based on the weight of the composition; a source of fluorine, present in an amount of 2 wt % to 15 wt %, based on the weight of the composition; and a solvent. The second composition may be free of titanium.

The present disclosure also provides a coated substrate, comprising, in consecutive arrangement: a glass or glass-ceramic substrate; a first layer on at least one side of the substrate; and a second layer on top of the first layer. The first layer comprises a tin compound, a fluorine compound, and a titanium compound. The second layer comprises a tin compound and a fluorine compound.

The present disclosure also provides a process of preparing a coated substrate, comprising the steps of: heating an uncoated glass or glass-ceramic substrate to a temperature between 1050 and 1200 F; applying a first composition to at least one side of the uncoated substrate, wherein the first composition comprises a source of tin, a source of fluorine, a source of titanium, and a solvent; applying a second composition on top of the first composition, wherein the second composition comprises a source of tin, a source of fluorine, and a solvent.

BRIEF DESCRIPTION OF THE DRAWINGS

FIG. 1 is a schematic drawing of the layered coating of the present disclosure.

DETAILED DESCRIPTION OF THE DISCLOSURE

Referring to FIG. 1, in the present disclosure a glass substrate 10 is coated with a first or sub layer 20, and a second or top layer 30. Glass substrate 10 can be used in a door for an oven, though is not necessarily limited to this application. Sub layer 20 and top layer 30 are applied to one or both sides of substrate 10 in the manner described below. The constituents of the compositions that make up each of sub layer 20 and top layer 30 are selected so that the coatings combine to reflect heat, or hinder its passage from the interior of an oven across substrate 10.

A first coating composition is used for sub or base layer 20. The first coating composition comprises a source of tin, a source of fluoride, a source of titanium, and a solvent. In one embodiment, the source of tin is a tin oxide. Suitable tin oxides can be dibutyl tin oxide or dioctyl tin oxide. Other tin oxides with straight chain carbons may be suitable as well. The source of tin may be present in the composition in an amount of 15 wt % to 50 wt %, based on the total weight of the composition, or any subranges therebetween.

The source of fluoride can be any compound that is miscible with the source of tin and the other components in the first composition. In one embodiment, the source of fluorine is a carboxylic acid with a fluoride group. One suitable example is trifluoro-acetic acid. The source of fluorine can be present in an amount of 5 wt % to 30 wt %, based on the total weight of the composition, or any subranges therebetween.

The source of titanium can be, in one embodiment, an organic titanium oxide. One suitable example is titanium isopropoxide. The source titanium of can be present in an amount of 2 wt % to 15 wt %, based on the total weight of the composition, or any subranges therebetween.

The solvent makes up the remaining amount of the first composition. In one embodiment, the solvent can be a straight-chain or branched hydrocarbon, one example of which is ethanol. Each of the source of tin, the source of fluorine, the source of titanium, and the solvent must be selected so that there is no phase separation in the first composition. There should be no solid particulate in the first composition, nor should the first composition separate into two or more distinct liquid phases, as would be the case in an emulsion.

Substrate 10 can be made of any glass or glass-ceramic material. Specific examples may include, but are not limited to, soda lime, borosilicate, or lithium-alumino-silicate.

The process of applying the first composition to form sub layer 20 is as follows. Substrate 10 is heated to a temperature of 1050° F. to 1200° F. The first composition is then sprayed or otherwise applied on to heated substrate 10, to form sub layer 20. In this method, first composition is applied to substrate 10, and sub layer 20 is formed via pyrolysis. The heat of the glass substrate burns off the volatile components of the first composition (e.g. the solvent), and the sub layer is formed. Other processes may be used to apply the first composition to the substrate, such as chemical vapor deposition.

The second composition of the present disclosure is applied over sub layer 20, to form top layer 30. The second composition also has a source of tin, and a source of fluorine. Importantly, the second composition is free of any source of titanium. As discussed below, this ensures that the second composition has a lower index of refraction than the first composition, and thus top layer 30 will have a lower index of refraction than sub layer 20.

The source of tin in the second composition can be similar to that in the first composition, namely a tin oxide. One suitable example is monobutyl tin trichloride. The source of tin may be present in the second composition in an amount of 15 wt % to 50 wt %, based on the total weight of the composition, or any subranges therebetween. The chemistry of the second composition can be the same as that of the first composition, with the exception that the titanium source is absent in the second composition. In another embodiment, the source of tin in the second composition can be chlorinated, because sub layer 20 provides a barrier between top layer 30 and substrate 10. Without this barrier, the chlorine in top layer 30 would react with the glass in substrate 10, and this would have an adverse effect on the color of substrate 10. Using a chlorinated tin compound in the second composition is advantageous because it makes the application process smoother.

The source of fluoride in the second composition can be similar to the first composition. In one embodiment, the source of fluorine is a carboxylic acid with a fluoride group. The source of fluorine in the second composition can also be an inorganic fluoride. One suitable example is hydrofluoric acid. The source of fluorine in the second composition can be present in an amount of 2 wt % to 15 wt %, based on the total weight of the composition, or any subranges therebetween.

As with the first composition, the solvent for the second composition can be a straight-chain or branched hydrocarbon, such as ethanol. In one embodiment, the solvent in the second composition may also be water. The solvent in the second composition makes up the remainder of the second composition. As with the first composition, the components of the second composition should be selected so that they are miscible with one another, do not induce any precipitate, or induce any phase separation.

Sub layer 20 has a higher index of refraction than top layer 30. The ratio of indices of refraction should be such that $n_s/n_t=1.05$ to 1.35, or any subranges therebetween, where $n_s$ is the index of refraction of sub layer 20, and $n_t$ is the index of refraction of top layer 30.

Top layer 30 is applied in the same manner and under the same conditions as described above with respect to sub layer 20. Namely, top layer 30 can be applied with pyrolysis, or other suitable processes such as chemical vapor deposition. As the pyrolysis of sub layer 20 is almost instantaneous, the second composition can be applied almost immediately after the first composition. There may also be a brief pause in between application of the two compositions, where substrate 10 is reheated if necessary to the desired temperature range. The compounds in the first and second composition will be altered after they are applied to substrate 10 and undergo pyrolysis. For example, the source of titanium in each of the first and second composition may react with ambient oxygen at the elevated temperatures present during application, to form titanium dioxide in one or both of sub layer 20 or top layer 30. However, aside from the solvent, which will evaporate, sub layer 20 and top layer 30 will retain the tin, fluorine, and titanium sources, in altered form.

Sub layer 20 will have a thickness of sixty to one hundred seventy-five nanometers, or any subranges therebetween. Top layer 30 will have a thickness of one hundred seventy-five to three hundred nanometers, or any subranges therebetween. As discussed above, and in the shown embodiment, each of sub layer 20 and top layer 30 are applied to both sides of substrate 10. The present disclosure contemplates that sub layer 20 and top layer 30 could be applied only to one side of substrate 10. The one side could be the side that faces the internal oven cavity, or the exterior side.

In the shown embodiment, sub layer 20 is applied directly to one or both sides of substrate 10. However, the present disclosure contemplates that there may be an intermediate layer (not shown) between substrate 10 and sub layer 20. This intermediate layer may enhance the appearance, strength, or other properties of substrate 10. The intermediate layer may be made of a material such as tin oxide, silicon dioxide, or titanium dioxide.

Without being bound by theory, it is believed that the source of titanium in the first composition alters the index of refraction of the first composition and thus sublayer 20, and provides heat reflecting properties as well. By creating a reflective pyrolytic coating with an adjusted refractive index (via use of titanium) as sub-layer 20 in a multi-layered coating, improvements in reflecting light wavelengths from 1000 nm to 3000 nm can be targeted. These infrared reflective surfaces can improve the overall performance and provide an anti-reflective effect for some wavelengths of visible light. The titanium source, pyrolytically deposited in conjunction with the source of tin, is not reactive with the atmosphere or additional chemicals. It adds to the overall performance of the multi-layer coating on glass and glass ceramic substrates used in heat reflective applications. Existing multi-layer coatings may employ materials with identical indices of refraction, which do not show good results for heat reflection.

The coated substrates 10 of the present disclosure (i.e., with layers 2 and 30) may be used in applications where reflection of wavelengths from 700 nanometers to 21,000 nanometers may be advantageous. As previously discussed, one application of this sort would be in residential and commercial ovens or other heating appliances operating in the rage from 245° C. to 500° C. with glass substrates, used as windows or doors. The substrates of the present disclosure may also be used in ovens or heating appliances operating in the range above 500° C., with low expansion glass substrates, used as windows or site glasses.

Example Compositions

First Composition:

| | |
|---|---|
| Dibutyl Tin Oxide | 15-50 wt % |
| Tri-fluoro Acetic Acid | 5-30 wt % |

-continued

| | |
|---|---|
| Titanium Isopropoxide | 2-15 wt % |
| Ethanol | q.s. |

Second Composition:

| | |
|---|---|
| Monobutyl Tin Tricholride | 15-50 wt % |
| Hydrofluoric Acid | 2-15 wt % |
| Water | q.s. |

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

The invention claimed is:

1. A substrate comprising:
   a glass or glass-ceramic substrates; and
   a first coating composition applied to the glass or glass-ceramic substrate, comprising:
      a source of tin;
      a source of fluorine;
      a source of titanium; and
      a solvent.

2. The substrate of claim 1, wherein the first coating composition is configured to form a first layer on the glass or glass-ceramic substrate via pyrolysis or chemical vapor deposition to create a coated substrate.

3. The coated substrate of claim 2, further comprising a second layer applied to the first layer, wherein the second layer has a lower index of refraction than the first layer.

4. The coated substrate of claim 3, wherein the first layer has a thickness of between 60 and 175 nanometers.

5. The coated substrate of claim 3, wherein the second layer has a thickness of between 175 and 300 nanometers.

6. The coated substrate of claim 3, wherein the first layer has a first index of refraction and the second layer has a second index of refraction, and wherein a ratio of the first index of refraction to the second index of refraction is between 1.05 and 1.35.

7. The coated substrate of claim 3, further comprising an intermediate layer between the glass substrate and the first layer.

8. The coated substrate of claim 7, wherein the intermediate layer comprises a material selected from the group consisting of silicon dioxide, titanium dioxide, and tin dioxide.

9. An oven door comprising the coated substrate of claim 3.

10. The coated substrate of claim 2, further comprising a second coating composition applied to the first layer, comprising:
    a source of tin,
    a source of fluorine, and
    a solvent.

11. The coated substrate of claim 10, wherein the source of tin in the second coating composition is present in an amount of 15 wt % to 50 wt % based on the weight of the second coating composition, and the source of fluorine in the second coating composition is present in an amount of 2 wt % to 15 wt % based on the weight of the second coating composition.

12. The coated substrate of claim 10, wherein the second coating composition consists of the source of tin, the source of fluorine, and the solvent.

13. An oven door comprising the coated substrate of claim 2.

* * * * *

UNITED STATES PATENT AND TRADEMARK OFFICE
CERTIFICATE OF CORRECTION

PATENT NO. : 11,472,964 B2
APPLICATION NO. : 16/587135
DATED : October 18, 2022
INVENTOR(S) : Daniel Caldwell Page 1 of 1

It is certified that error appears in the above-identified patent and that said Letters Patent is hereby corrected as shown below:

In the Claims

At Column 5, Line 25, "substrates; and" should be -- substrate; and --.

At Column 5, Line 33, "substrate" should be -- coated substrate --.

Signed and Sealed this
Fifth Day of March, 2024

Katherine Kelly Vidal
*Director of the United States Patent and Trademark Office*